United States Patent

Kostelnicek

[15] 3,689,875
[45] Sept. 5, 1972

[54] FLEXIBLE GEOPHONE

[72] Inventor: Richard J. Kostelnicek, Houston, Tex. 77025
[73] Assignee: Esso Production Research Company
[22] Filed: May 27, 1971
[21] Appl. No.: 147,490

[52] U.S. Cl. ..................340/17, 340/7, 340/261
[51] Int. Cl. ..............................G01v 1/16
[58] Field of Search ............340/17, 7, 261; 73/70

[56] References Cited

UNITED STATES PATENTS

| | | | |
|---|---|---|---|
| 2,807,793 | 9/1957 | Bayhi | 340/17 |
| 2,906,995 | 9/1959 | Chernosky | 340/17 |
| 3,375,490 | 3/1968 | Stubblefield | 340/17 |

Primary Examiner—Benjamin A. Borchelt
Assistant Examiner—R. Kinberg
Attorney—James A. Reilly, John B. Davidson, Lewis H. Eatherton, James E. Gilchrist, Robert L. Graham and James E. Reed

[57] ABSTRACT

A pressure sensitive seismic detector is formed of at least two elongated sheets or layers of flexible, rubberous material having particulated magnetic material embedded therein. The particulated magnetic material is preferably barium ferrite. The layers are connected together at spaced apart locations and magnetized across the width thereof so as to form a plurality of parallel bar magnets along the length thereof with the poles of adjacent magnets reversed. Coils are wound between the bar magnets on at least one of the layers. Preferably, the sense of winding of adjacent coils is reversed, and the magnets formed in adjacent flexible sheets are aligned so that they repel each other. To form a hydrophone, the apparatus is encased in a thin flexible bag or enclosure and positioned in a liquid filled cable housing. In one embodiment, magnetic metal foil is affixed to the nonengaging surfaces of two adjacent layers of rubberous material.

10 Claims, 6 Drawing Figures

INVENTOR.
RICHARD J. KOSTELNICEK

BY John B Davidson

ATTORNEY

PATENTED SEP 5 1972

INVENTOR.
RICHARD J. KOSTELNICEK

BY John B. Davidson

ATTORNEY

FLEXIBLE GEOPHONE

BACKGROUND OF THE INVENTION

The present invention relates to an improved type of seismic detector for use in seismic exploration, and more particularly, to a velocity-type seismic detector that can be moved as by towing, without impairing the operability thereof or requiring repositioning by hand prior to each seismic observation.

The seismic technique for exploration for oil or other mineral deposits comprises the steps of producing a seismic disturbance at or near the earth's surface, as by the use of dynamite, heavy weights, or vibrators, and detecting the resulting seismic energy at various locations on the surface of the earth by means of sensitive seismic energy detectors, or geophones which translate the detected waves into electrical pulses which, after suitable amplification, can be recorded as data traces. Usually, the geophones are placed in line with the shot point and are more or less evenly spaced from each other and from the shot point. Each geophone is connected through a suitable cable to a recording station, usually a field truck.

The seismic technique as usually practiced is based on the principle that part of the energy of the artificial seismic disturbance will travel downwardly and be reflected back toward the earth's surface by various more or less well defined substrata, and that the reflected energy can be detected by the geophones and suitably recorded on the seismograph record. It is desirable to place on one record the traces or data records from as many geophone locations as practical to facilitate the identification of reflections and to discriminate against other seismic signals, commonly called "noise," which are also detected by the geophones.

In order to increase the effectiveness of the seismic technique, it has become the usual practice to employ a large number of geophones at each detecting station, and connected in series or in series-parallel so as to produce one data record. This practice has many advantages, including canceling out of events produced as a result of near surface anomalies. For example, assume that a single geophone is located at a detecting station and it is near a buried localized seismic wave reflector, such as a large rock. An anomalous travel time will be obtained for seismic waves reaching that geophone. On the other hand, if there are 30 or 40 geophones at the detecting station connected in series or series-parallel, anomalous seismic energy will produce electrical signals that statistically cancel each other and will not obscure relatively weak signals produced by seismic wave reflections from geologic interfaces. Furthermore, a plurality of geophones will act as a directional receiver if they are linearly distributed in the direction of the line of spread of geophone stations and connected in series or series-parallel. Signals that are not lined up will tend to cancel out whereas nearly plane wave fronts produced by reflections from substrata will arrive at all of the geophones at substantially the same time and electrical signals produced thereby will additively combine.

Furthermore, in order to reduce the cost of seismic exploration, it it desirable to be able to move geophones from station to station without having to position them by hand after each move. To this end, it is desirable to be able to tow a geophone cable from one location to another after each seismic observation. Manifestly, if each geophone is separately connected to the cable and the geophones are of conventional design, crew personnel must go along the line of the cable prior to each seismic observation to vertically position the geophones; otherwise, the geophones will produce little or no output signal. Therefore, it is desirable to have a seismic energy detector that will operate satisfactorily in any position, even after having been towed across the earth's surface for a considerable distance.

SUMMARY OF THE INVENTION

In accordance with the present invention, there is provided apparatus for detecting seismic energy comprising at least two elongated flexible magnetic members preferably laterally flattened and magnetized such that magnetic poles are spaced apart along the length dimension thereof, connected together at spaced apart locations along the length thereof, and electrical coil means supported by at least one of said members whereby variations in spacing between portions of said flexible magnetic members will induce electrical voltage in the coil means. Preferably, each of the flexible magnetic members comprises an elongated rubberous or elastomeric material impregnated with particulated ferromagnetic material such as barium ferrite. The spacing between locations at which the magnetic members are connected together preferably is between about 5 cm and about 35 cm. To facilitate towing along the earth's surface, layers preferably are encased in an abrasion resistant housing.

Objects and features of the invention which are not apparent from the above description will become evident upon consideration of the following detailed description of an embodiment of the invention when considered in connection with the accompanying drawings.

DESCRIPTION OF THE PREFERRED EMBODIMENT

Figure 1:
FIG. 1 is a view of a seismic wave detector cable in accordance with the invention disposed on the earth's surface.

FIG. 1 illustrates a seismic cable according to the invention, disposed along the earth's surface. The cable comprises a number of active cable sections 1A, 1B, 1C, and 1D, each capable of detecting seismic waves and constructed as described below with respect to FIGS. 2, 3, and 4. The active sections are connected to a number of inactive spacer sections designated as 2A, 2B, and 3A in FIG. 1, connected to either end of the active sections 1A, 1B, 1C, and 1D, and in turn connected to other active geophone sections. The coupling members between the geophone sections may be any of a number of types of couplings known to the prior art particularly in connection with marine geophone cables such as are manufactured by Seismic Engineering Incorporated of Dallas, Texas, and Vector Cable Company of Houston, Texas. Electrical leads from the active geophone sections will pass through the inactive geophone sections and other active sections and eventually will be connected to suitable recording apparatus in a seismic recording truck. Typically, the length of any given active geophone section in a cable may be from 30 to 100 meters and the spacing between sequences of active geophone cable sections may be 5 to 60 meters. The total length of an entire geophone cable system may be 500 to 2,500 meters.

Figure 2:
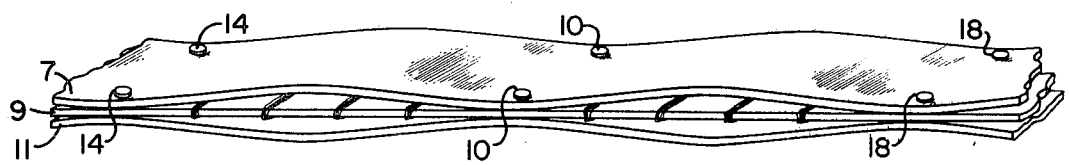
FIG. 2 is a perspective view of a portion of a seismic energy detector in accordance with the invention.

With reference now to FIG. 2, there is illustrated a portion of a seismic detector according to the invention. It is to be understood that the segment shown in FIG. 2 is only a very small portion of the entire structure. Typically, the portion shown in FIG. 2 will be between 10 cm and 70 cm long whereas the entire active cable section would be up to about 100 meters in length. FIG. 2 illustrates three flexible magnetic members 7, 9, and 11 riveted together by pairs of rivets 14, 16, and 18 at spaced apart locations along the length thereof. Each of the flexible magnetic members is laterally flattened and preferably is of rectangular cross section, so that the average thickness is a small fraction (one-fourth or less) of the width. The members 7, 9 and 11 preferably may be between 1 and 100 meters long and may be riveted together or otherwise joined together at spaced intervals of between 5 and 35 cm. Alternatively, separate short sections of flexible magnetic members riveted together at the ends, may be connected together by short sections of canvas or other tough, flexible material to facilitate fabrication of a composite cable structure. The flexible magnetic members 7, 9, and 11 are formed of a rubberous material, such as a natural or synthetic rubber, and preferably a material capable of retaining its elasticity and flexibility at the extremes of temperatures in the operating locality at which the cable is to be used. For example, if the cable is to be used in the Arctic, the material should retain its elasticity and flexibility at temperatures as low as $-40°$ C and as high as 40° C. If it is to be used in the desert, it should maintain elasticity and flexibility at temperatures as high as about 70° C. A suitable rubberous material for use in many locations is neoprene. In order to impart magnetic characteristics thereto, the rubberous material should be loaded or impregnated with a ferromagnetic particulate material such as barium ferrite. A suitable rubberous material impregnated with barium ferrite is available from Magnetic Aids, Inc., 11 W. 42nd Street, New York, New York, Model 2-P-300 and termed Flexible Magnetic Strip Plain. Similar material is manufactured by H. O. Canfield Co., of Seymour, Indiana, B. F. Goodrich Co. of Marietta, Ohio, and 3M Plastifoam Division of Cincinnati, Ohio. Preferably, the material should be between 1 and 5 mm in thickness, between 1 and 25 cm in width, and should be impregnated with barium ferrite or other particulated ferromagnetic material to about 1 gram of ferrite per cubic centimeter of rubberous material.

The flexible magnetic material is magnetized in narrow strips along the width dimension, and the magnetized strips or sections are spaced apart along the length dimension of the material. The effect is that the flexible material comprises a number of parallel bar magnets with the poles of adjacent magnets reversed. Preferably, the distance along the edges of the material between the center lines of adjacent magnetized strips should be between 3 and 15 mm. Suitable apparatus for magnetizing the flexible magnetic material is available from RFL Industries, Inc. of Boonton, New Jersey, Model No. 942.

Figure 3:
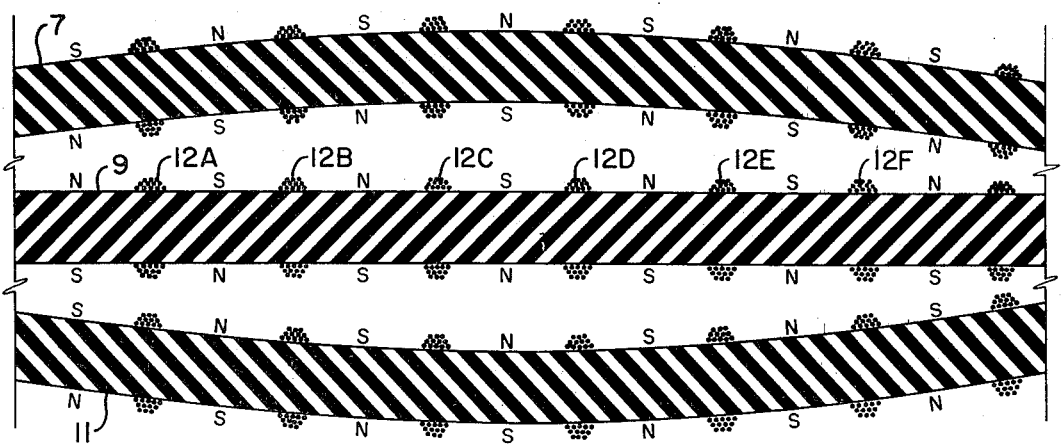
FIG. 3 is an enlarged view of a portion of the detector shown in FIG. 2.

A multiplicity of coils designated in FIG. 3 by reference numerals 12A through 12F, each preferably having between 25 and 500 windings, are wound on the flexible magnetic material 9. The coils are spaced apart along the length of the magnetic material 9 a distance substantially equal to the distance between the bar magnet sections. Preferably, each of the coils is positioned between adjacent magnet sections. Adjacent coils are wound in the opposite sense and are connected in series circuit relationship so that voltages induced therein are additive. The sheets of magnetic material 7, 9, and 11 are positioned relative to each other so that poles of like polarity are aligned opposite one another as illustrated in FIG. 3. Manifestly, under this condition the sheets 7 and 11 will be repelled from each other and from sheet 9 so as to form a bow or arch between riveted locations as illustrated in FIG. 1.

Figure 4:
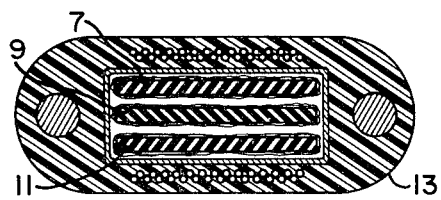
FIG. 4 is a sectional view of the seismic energy detector of FIG. 2 encapsulated in an abrasion resistant housing.

The assembly is then inserted within an elongated bag-like enclosure 13, preferably of a strong material such as canvas. As illustrated in FIG. 4, the bag 13 and a pair of elongated steel cables which act as stress members, are formed in a unitary structure by encasing them with a plastic material such as polypropylene or other suitable moldable material. The plastic material should be highly abrasion-resistant and the entire structure should be flexible so as to conform to the surface of the earth even in rough terrain insofar as possible. The steel cables may be about 1 cm in diameter and should extend the entire length of the cable system. Preferably, provision should be made for the steel cables in each cable section to be securely connected to corresponding cables in the other cable sections so that the entire cable can be dragged over the earth's surface without separating. Similar stress members are customarily used in marine seismic cables and serve the same purpose as in the present invention.

The coils in a cable section preferably are connected in series-parallel. Adjacent coils are connected in series in a set or array until a desired impedance is achieved across the terminals of the series-connected coils. The impedance should not be so high that stray noise pickup is excessive. Each array of series-connected coils is then connected in parallel with other arrays of coils and the entire series-parallel sequence of coils in a particular active geophone section is connected to a line of matching impedance leading to the seismic recorder. The number of coils connected in series in a particular set or array will be determined by the number of windings in the coil, the size of the wire, the number of adjacent cable segments connected together, and other factors well known to the electrical art. The important point to consider is that the impedance of the series parallel connected arrays of coils should match the impedance of the line leading to the seismic recorder.

When seismic energy impinges upon the structure illustrated in FIGS. 2, 3, and 4, the structure will be deformed to a greater or lesser extent depending upon the magnitude of the energy striking it in a particular position. As a result of this deformation, the relative positions of the members 7, 9, and 11 will change, thereby changing the shape of the magnetic field therebetween. The change in the strength and shape of the magnetic field at any particular location will result in a voltage being induced in the coils that the magnetic lines of flux intersect at that location. It will be found that the voltage thus induced across the coils will be functionally related to the strength of the seismic energy impinging upon the structure. A substantially vertically traveling plane wave front, such as will be produced by seismic energy reflected from a deep subsurface earth interface, will strike the entire structure substantially simultaneously so that the electrical signals produced across the various individual coils will be additive and a strong high amplitude electrical output signal will result. On the other hand, seismic noise or randomly arriving seismic energy will produce voltages across only a limited number of the coils. Statistically, these voltages will tend to cancel each other. In addition, voltages produced by stray magnetic fields will have a minimal effect because adjacent coils are wound in opposite directions and the voltage induced by stray fields will tend to cancel each other.

Figure 5:
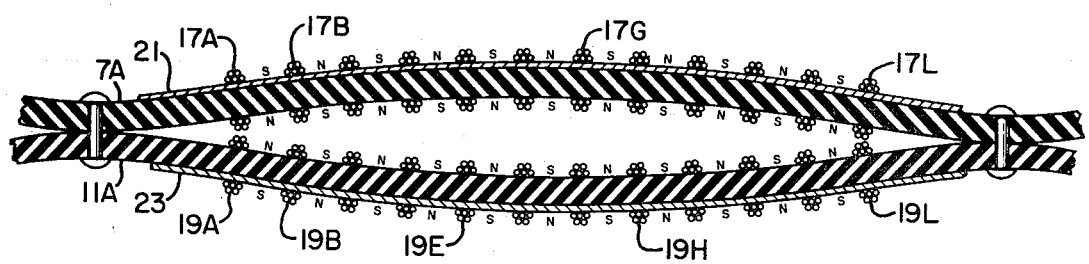
FIG. 5 is a cross sectional view illustrating another embodiment of the invention.

In FIG. 5 there is illustrated an embodiment of the invention making use of only two layers or sheets of flexible, magnetic rubberous material formed as described above and designated by the reference numerals 7A and 11A. In this embodiment the necessity for an immediate layer of elastic magnetic material is eliminated. Both of the layers or sheets have bar magnets formed therein as described above. Thin strips of flexible magnetic metal foil, preferably iron foil, are cemented in direct contact with the sheets of magnetic rubberous material. Metal foil 21 is cemented to the upper, outer surface of magnetic rubberous sheet 7A and the magnetic metal foil 23 is cemented to the lower, outer surface of magnetic rubberous sheet 11A. The length of the magnetic metal foil strips is slightly less than the distance between the rivets. Coils 17A, 17B . . . 17L are wound around and supported by foil 21 and rubberous magnetic strip 7A and coils 19A, 19B . . . 19L are wound around and supported by foil 23 and rubberous magnetic strip 19A. The coils are wound around both the magnetic strip corresponding thereto and the magnetic foil member cemented to the strip and are positioned approximately half-way between the magnetized bar magnets which are formed in the magnetic strips in the same manner as described above with respect to FIG. 3. Again, adjacent coils are wound in opposite senses and are connected in series as described with respect to the embodiment of FIGS. 2, 3, and 4. The rubberous magnetic layers or sheets 7A and 11A are riveted together with the bar magnets formed in the layers positioned so that like poles in the strips are adjacent to and face each other when the members 7A and 11A are riveted together. The effect of a rubberous magnetic strip and its corresponding metal foil is that the bar magnets formed in the strips are converted into horseshoe magnets. The magnetic rubberous members 7A and 11A will be repelled from each other, as illustrated. When a seismic wave impinges upon the structure, the distance between the rubberous magnetic members and the coils and metal foils carried thereby will vary so as to produce a change in the magnetic field cutting the various coils and thus produce an output voltage from the overall structure.

Figure 6:
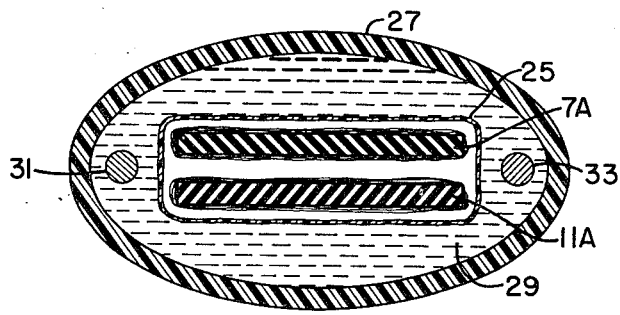
FIG. 6 is a cross sectional view of the embodiment of FIG. 5 encased in a marine cable for use as a hydrophone.

The embodiment of FIG. 5 is particularly adapted for use in a marine environment, as is illustrated in FIG. 6. The magnetic rubberous strips 7A and 11A and the coils and metal foils carried thereby are encased in a bag or envelope of a very thin plastic material such as polypropylene having a thickness between 1 and 5 mils. The air pressure within the polypropylene bag preferably is at substantially atmospheric pressure. The entire structure is then placed inside of a conventional marine cable housing 27 which may be a generally tubular member of a tough plastic such as polypropylene, carrying a pair of longitudinal stress members 31 and 33. To control the buoyancy of the cable, the structure is filled with oil 29 of desired density. The result is that the seismic detector will be a pressure sensitive hydrophone inasmuch as the pressure produced by seismic wave impinging upon the cable will be transmitted through the oil 29 and the envelope 25 to the rubberous elastic member 7A and 11A to vary the spacing between the elastic member 7A, 11A and produce an electrical output signal across the coils thereof. The structure of FIG. 6 is illustrated as if it were in the air. Manifestly, as soon as the structure is immersed in water and submerged to operating depth in the water (5 to 40 feet), the hydrostatic pressure of the water will cause the bag or envelope 25 to snugly fit around the rubberous magnetic members 7A, 11A, the iron foils 21, 23 and coils supported thereby. The envelope 25 may be any desired length but must be fluid-tight both insofar as the air within the envelope and the oil in which it is immersed is concerned.

The seismic detecting system described above is easy to lay out and requires no hand positioning of individual elements. The highly abrasion and wear resistant plastic casing material can be made to have long life. Even when the casing must be replaced, the active detecting structure including the magnetic rubberous strips 7, 9, and 11 can be salvaged and reused with a new plastic mold material. The seismic detecting system will be found to greatly reduce the cost of seismic exploration, particularly in snow covered and desert areas of the earth.

What is claimed is:

1. Apparatus for detecting seismic energy, including:
   at least two elongated, laterally flattened flexible magnetic members magnetized in substantially parallel strips along the traverse dimension thereof such that magnetic poles are spaced apart along the length dimension thereof, said flexible magnetic members being connected at spaced apart locations along the length thereof and positioned so that poles of like polarity are aligned opposite one another;

an electrical coil means supported by at least one of said members whereby variation in spacing between portions of said flexible magnetic members will induce electrical voltage in said coil means.

2. The apparatus of claim 1 wherein the poles of adjacent magnetized strips are oppositely oriented.

3. The apparatus of claim 1 wherein each of the flexible magnetic members comprises an elongated rubberous material impregnated with particulated magnetic material.

4. The apparatus of claim 3 wherein the particulated magnetic material is barium ferrite.

5. The apparatus of claim 1 wherein the spacing between locations at which the magnetic members are connected together between 5 cm and about 35 cm.

6. The apparatus of claim 1 wherein adjacent coils are wound in an opposite sense, and are connected together so that voltages produced thereby are additive.

7. The apparatus of claim 1 wherein the members are encased in an abrasion resistant housing.

8. The apparatus of claim 1 wherein the flexible magnetic members are two in number, a magnetic metal layer is on each of the outer surfaces of the flexible magnetic members, and coil means are supported on each of the magnetic members.

9. The apparatus of claim 1 wherein the flexible magnetic material is magnetized in parallel strips extending along the width dimension thereof to form a plurality of magnets and wherein the magnetized strips are spaced apart along the length dimension of the flexible magnetic material so that the center line of adjacent magnetized strips are between 3 and 15 mm apart.

10. The apparatus of claim 8 further including a closed fluid impermeable membrane enveloping the magnetic members, magnetic metal layers, and coil means.

* * * * *